US008538267B2

(12) United States Patent
Ji et al.

(10) Patent No.: US 8,538,267 B2
(45) Date of Patent: Sep. 17, 2013

(54) ROADM TRANSPONDER AGGREGATOR SYSTEMS AND METHODS OF OPERATION

(75) Inventors: Philip N. Ji, Princeton, NJ (US); Yoshiaki Aono, Chiba (JP); Ting Wang, West Windsor, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 391 days.

(21) Appl. No.: 12/814,904

(22) Filed: Jun. 14, 2010

(65) Prior Publication Data
US 2011/0085803 A1 Apr. 14, 2011

Related U.S. Application Data

(60) Provisional application No. 61/326,394, filed on Apr. 21, 2010.

(51) Int. Cl.
*H04J 14/02* (2006.01)
(52) U.S. Cl.
USPC .................................. 398/85; 398/83; 398/84
(58) Field of Classification Search
USPC ....................................................... 398/83–85
See application file for complete search history.

(56) References Cited

U.S. PATENT DOCUMENTS

2009/0220242 A1* 9/2009 Ooi et al. ........................ 398/83
2010/0272441 A1* 10/2010 Boduch et al. .................. 398/83

OTHER PUBLICATIONS

S. Thiagarajan, L. Blair, and J. Berthold, "Direction-Independent Add/Drop Access for Multi-Degree ROADMs," in Optical Fiber Communication Conference and Exposition and the National Fiber Optic Engineers Conference, OSA Technical Digest (CD) (Optical Society of America, Feb. 24, 2008).*
Renais, O., et al. "Migrating to a Next GEN WDM Network" Proceedings of the 13th International Telecommunications Network Strategy and Planning Symposium. Networks 2008. Oct. 2008.*
Ji, P., et al. "Colorless and Directionless Multi-Degree Reconfigurable Optical Add/Drop Multiplexers" 2010 19th Annual Wireless and Optical Communications Conference (WOCC 2010). May 2010. pp. 13-17.
Kaman, V., et al. "Multi-Degree ROADM's With Agile Add-Drop Access" Photonics in Switching 2007. Aug. 2007. (2 Pages).
Renais, O., et al. "Migrating to a Next GEN WDM Network" Proceedings of the 13th International Telecommunications Network Strategy and Planning Symposium. Networks 2008. Oct. 2008. (16 Pages).
Roorda, P., et al. "Evolution to Colorless and Directionless ROADM Architectures" OFC/ NFOEC 2008. Feb. 2008. (3 Pages).
Thiagarajan, S., et al. "Direction-Independent Add/Drop Access for Multi-Degree ROADMS" OFC/NFOEC 2008. Feb. 2008. (3 Pages).
Tibuleac, S., "ROADM Network Design Issues" OFC/NFOEC 2009. Mar. 2009. (48 Pages).

* cited by examiner

*Primary Examiner* — Nathan Curs
(74) *Attorney, Agent, or Firm* — Joseph Kolodka

(57) ABSTRACT

ROADM node systems and methods of operation are disclosed. ROADM node systems may include transponder aggregators including transponders to add signals for switching through the ROADM node. The transponder aggregators may be constrained from adding signals on adjacent channels for simultaneous use. Further, the transponder aggregators may include an optical coupler in lieu of an optical multiplexer. The ROADM system may include a set of wavelength selective switches associated with output ports that can provide an additional filtering function for the added signals prior to transmission on a WDM network.

20 Claims, 5 Drawing Sheets

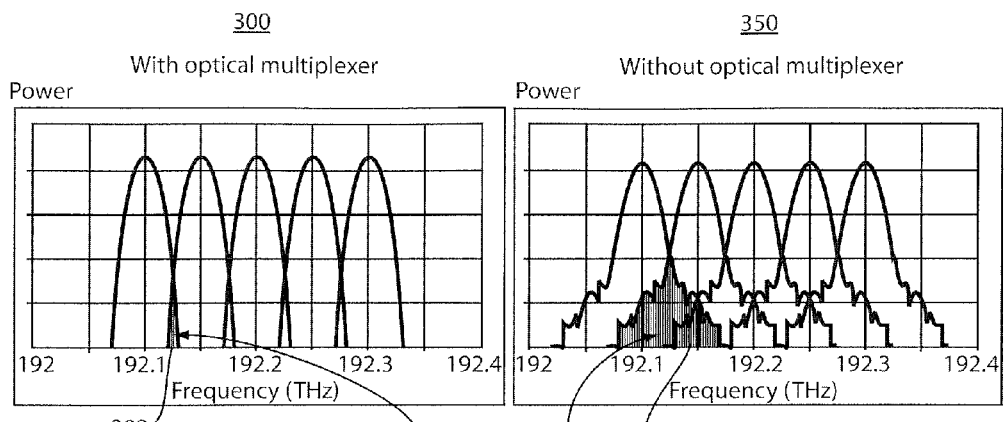
FIG. 3A
FIG. 3B
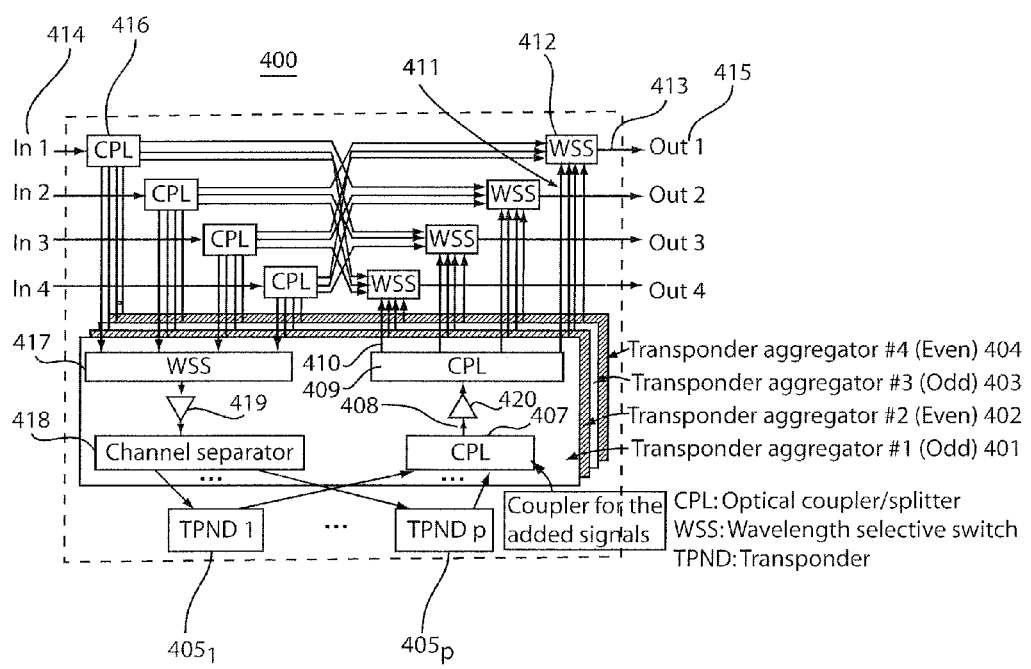
FIG. 4

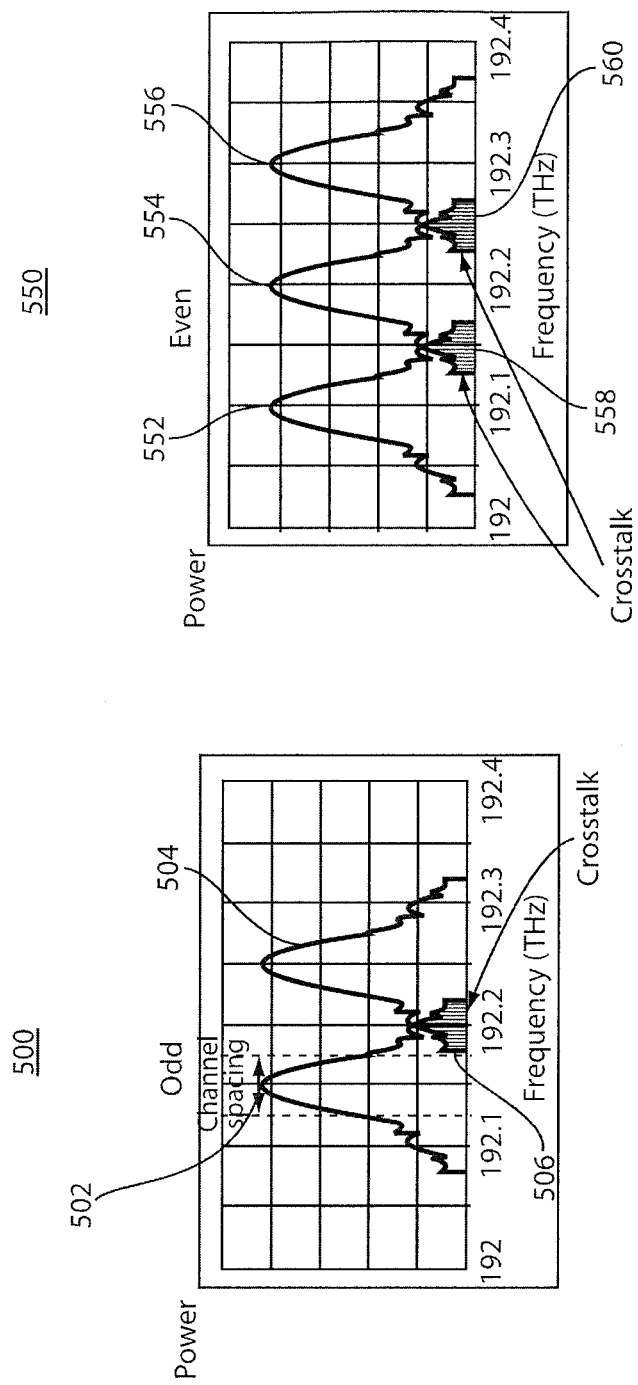

ROADM TRANSPONDER AGGREGATOR SYSTEMS AND METHODS OF OPERATION

RELATED APPLICATION INFORMATION

This application claims priority to provisional application Ser. No. 61/326,394 filed on Apr. 21, 2010, incorporated herein by reference.

This application is also related to commonly owned co-pending application Ser. No. 12/718,145 filed on Mar. 5, 2010 and commonly owned provisional application Ser. No. 61/250,185 filed on Oct. 9, 2009, each of which is incorporated herein by reference.

BACKGROUND

1. Technical Field

The present invention relates to reconfigurable optical add/drop multiplexer (ROADM) systems and methods of operation and, in particular, to managing added signals in an ROADM node.

2. Description of the Related Art

A reconfigurable optical add/drop multiplexer (ROADM) node is an important optical network element that permits flexible adding and dropping of signals on any or all wavelength division multiplexing (WDM) channels at the wavelength layer. A multi-degree ROADM node (MD-ROADM), which can correspond to a ROADM node with 3 degrees or higher, is another optical network element that also provides a cross-connection function of WDM signals among different paths. Although conventional ROADM nodes have a certain degree of flexibility for adding and dropping signals on WDM channels, they do not possess sufficient flexibility to adapt to rapidly growing and increasingly dynamic Internet-based traffic. For example, transponders of conventional ROADM nodes typically do not have non-blocking and wavelength transparent access to all dense wavelength division multiplexing (DWDM) network ports. As a result, colorless and directionless (CL&DL) MD-ROADM nodes have been widely studied recently to replace conventional ROADM nodes. In this context, "colorless" can refer to ROADM nodes in which transponders can receive and transmit signals on any wavelength employed by the ROADM node system. In turn, "directionless" can refer to ROADM nodes in which transponders can receive signals originating from any input port and can forward signals to any output port.

Some current, proposed methods for building CL&DL MD-ROADM nodes suggest employing a large scale fiber switch, also referred to as a photonic cross-connect (PXC). For example, with reference to FIG. 1, according to these methods, a large scale fiber switch 102 can be implemented at the core of the ROADM node 100. Alternatively, with reference to FIG. 2, other methods suggest implementing large scale fiber switches 202 and 204 between transponders 206 and the multiplexers 208 in the ROADM node 200.

SUMMARY

The CL&DL MD-ROADM nodes described above incur significant expense due to the high cost of using large port-count fiber switches. Moreover, the architecture illustrated in FIG. 1 also presents a large single point of failure in the node and is thus undesirable. In contrast, exemplary implementations of the present invention described herein below provide a low-cost ROADM node system and method of operation that can facilitate flexible add/drop capabilities while maintaining a low crosstalk level between channels. In particular, a significant advantage provided by exemplary embodiments of the present inventions is that an ROADM node can utilize the full, available spectrum for transmission of signals on a WDM network despite the use of an inter-channel cross-talk mitigation scheme for internal switching purposes.

One exemplary embodiment of the present invention is directed to a method for managing signals in a WDM network that can be implemented in an ROADM node. In accordance with the method, a first set of signals can be added via a first plurality of transponders within a first transponder aggregator to switch the signals through the ROADM. The adding step can be constrained from adding signals on adjacent, pre-defined channels for simultaneous use. In addition, a second set of signals can be added via a second plurality of transponders within a second transponder aggregator such that at least a portion of the second set of signals is on at least one channel that is adjacent to a channel including any of the signals in the first set of signals. Thereafter, the first and second sets of signals can be transmitted from the ROADM node on corresponding channels.

Another exemplary embodiment of the present invention is drawn towards an ROADM node system for managing signals in a WDM network. The system may include a plurality of transponder aggregators. Each transponder aggregator, in turn, may include a plurality of transponders configured to add signals on a subset of channels from a pre-defined set of channels to switch the signals through the ROADM node. At least one of the transponder aggregators can be of a first type in which transponders are constrained from adding signals on adjacent, pre-defined channels for simultaneous use. At least one other transponder aggregator can be of a second type in which transponders add signals on at least one channel that a transponder aggregator of the first type is constrained from using to switch signals through the ROADM node.

An alternative exemplary embodiment of the present invention is directed to a transponder aggregator system for use in an ROADM node for managing signals in a wavelength-division multiplexing network. The transponder aggregator system may include a plurality of transponders configured to add signals on a subset of channels from a pre-defined set of channels to switch through the ROADM node. The transponders may be constrained from adding signals on adjacent channels, from the pre-defined channels, for simultaneous use. The system may further include a switch configured to select signals and corresponding channels to drop to the plurality of transponders.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 3A is a graph illustrating the crosstalk between channels exhibited by an MD-ROADM system that employs an optical multiplexer for channels including added signals.

FIG. 3B is a graph illustrating the crosstalk between channels exhibited by an MD-ROADM system that does not employ an optical multiplexer for channels including added signals.

FIG. 4 is a block/flow diagram of an exemplary system/apparatus embodiment of an ROADM node.

FIG. 5A is a graph illustrating the channel crosstalk exhibited by signals output from an "odd" transponder aggregator according to an exemplary embodiment of the present invention.

FIG. 5B is a graph illustrating the channel crosstalk exhibited by signals output from an "even" transponder aggregator according to an exemplary embodiment of the present invention.

DETAILED DESCRIPTION OF PREFERRED EMBODIMENTS

Figure 1:
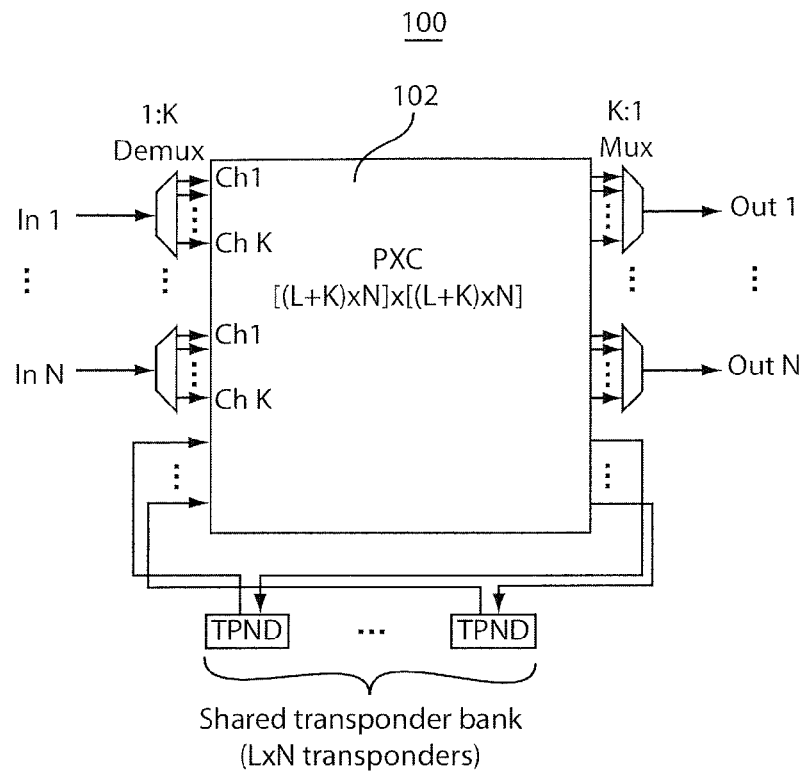
FIG. 1 is an exemplary MD-ROADM system that utilizes a large scale fiber switch.

Prior to describing exemplary embodiments of the present invention in detail, it is important to note that, because CL&DL MD-ROADM nodes permit flexible wavelength assignment, optical multiplexers that were commonly used in the conventional ROADM nodes can typically no longer be employed. In lieu of optical multiplexers, optical couplers can be used in transponder aggregators to combine added signals on channels received from local transponders. However, such "multiplexer-less" architectures have a drawback in optical performance.

For example, the absence of the multiplexer leads to inter-channel crosstalk among different DWDM channels, and, in particular, between the adjacent channels. In general, as the transmission bit rate increases, the signal spectrum widens and the inter-channel crosstalk becomes more severe. FIGS. 3A and 3B illustrate the incidence of crosstalk that results after removing an optical multiplexer for 128 Gb/s PDM-NRZ-QPSK (polarization division multiplexed-non-return to zero-quadrature phase shift keying) signals over a 50 GHz-spaced DWDM system in a conventional ROADM node. For example, FIG. 3A is a plot 300 of power v. frequency of an output of a conventional ROADM node with an optical multiplexer, while FIG. 3B is a plot 350 of power v. frequency of an output of a conventional ROADM node without an optical multiplexer. As illustrated in FIGS. 3A and 3B, the crosstalk 352 of outputs of a conventional ROADM node without an optical multiplexer is significantly larger than the crosstalk 302 of outputs of a conventional ROADM node with an optical multiplexer.

To mitigate the crosstalk problem, the optical couplers used in transponder aggregators to combine added signals from local transponders can be replaced with a wavelength selective switch (WSS). While this may eliminate the crosstalk issue, the solution is also costly due to the requirement of an additional WSS in each transponder aggregator. Moreover, the WSS port count is limited. For example, common commercially available WSS devices have a 9×1 configuration.

With reference now to FIG. 4, an MD-ROADM node 400 in accordance with an exemplary embodiment of the present invention is illustrated. The exemplary node 400 includes input ports 414 and output ports 415. It should be understood that "CPL" refers to an optical coupler/splitter. As illustrated in FIG. 4, each input is associated with a splitter 416 that splits input signals and provides them to wavelength selective switches 412. Each wavelength selective switch (WSS) 412 is associated with a different output port 415. The splitter 416 can also provide its input signal to each WSS 417 in each transponder aggregator. For an N degree node (having N input ports and N output ports), there are N transponder aggregators to provide colorless and directionless add/drop functions. Accordingly, the exemplary ROADM node 400 includes four transponder aggregators 401-404, as the node has four input ports and four output ports. Each WSS 417 provides a drop signal selection function and can transmit selected channels from all input ports to the channel separator 418, which in turn, separates the selected channels for input to p transponders, $405_1$-$405_p$ in the corresponding aggregator. Here, the signals on the selected channels are transmitted by the corresponding transponders to various clients (not shown). For example, the transponders (on the 'WDM side' or 'line side') may convert the dropped optical signals to electrical signals for transmission to a client (on the 'client side'). In turn, the client may provide the transponder with other data that the transponder adds on optical channels for subsequent transmission on the WDM network. For example, the transponder may receive client data in the foam of electrical signals and may convert them to optical signals. Typically, the transponders $405_1$-$405_p$ add the client data to the same channel it receives from the channel selector 418. In other words, the transponders add client data to channels on which dropped signals are received. However, any one or more of the transponders $405_1$-$405_p$ can be tunable such that the client data can be added to any available channel, different from the channel it receives that includes dropped signals, as long as the channel selected to add the client data is not employed elsewhere, for example, in the transponder aggregator and/or in the ROADM node.

It should be noted that p is the number of channels selected by WSS 417 in one particular instance. Each transponder aggregator may have additional transponders. Furthermore, in this exemplary embodiment, the transponders $405_1$-$405_p$ can add signals on DWDM channels for switching through the ROADM node and subsequent transport to the WDM network through one or more output ports 415. Signals from transponders $405_1$-$405_p$ may be provided to coupler 407, which, in turn, couples its received signals and provides the coupled signals to a splitter 409. The splitter 409 splits its received signals and can provide the signals to each WSS 412 of each output port 415. The WSS 412 selects channels/signals for output on its corresponding port. In addition, it should also be noted that each of the transponder aggregators may include optical amplifiers 419 and 420 between the WSS 417 and the channel separator 418 and between the coupler 407 and the splitter 409, respectively. Furthermore, the transponder aggregators 402-404 can have the same components and configuration as that shown for transponder aggregator 401 in FIG. 4, except with respect to channel constraints, as discussed further herein below. Moreover, although the WSS 417, optical couplers 407 and the optical splitter 409 are shown as being included in the transponder aggregator, in alternative embodiments, any one or more of these components may be external to transporter aggregators.

Figure 2:
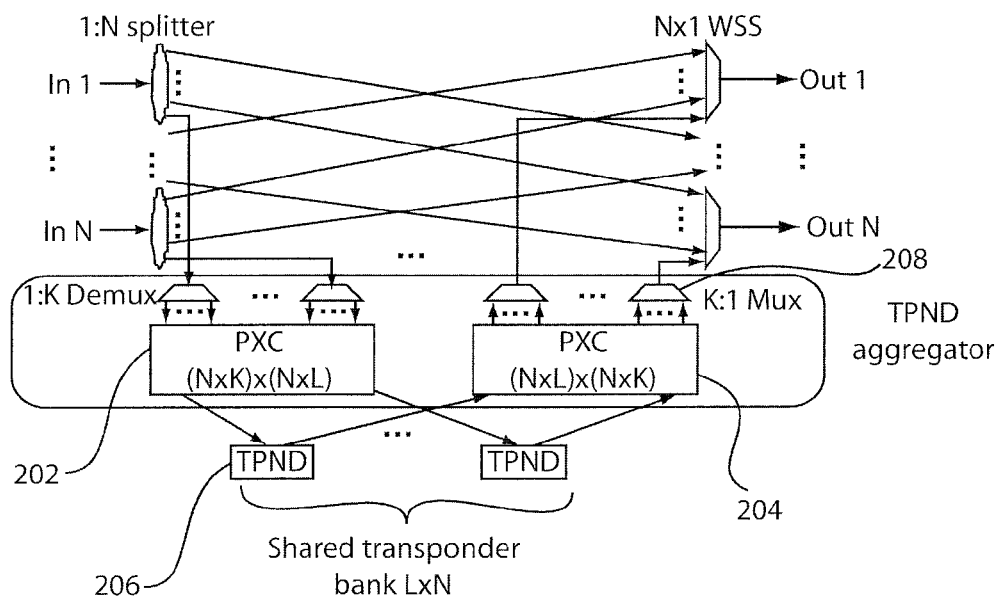
FIG. 2 is an alternative exemplary MD-ROADM system that utilizes a large scale fiber switch.

As discussed further herein below, the exemplary ROADM node 400 uses a novel transponder aggregator wavelength assignment scheme to avoid adjacent channel crosstalk within each transponder aggregator, while at the same time enabling the use of the full spectrum of available channels for output from the ROADM node and transmission on the WDM network. Furthermore, system 400 uses the WSS 412 at each degree's output 415 to remove the overall adjacent crosstalk from different transponder aggregators 401-404. Moreover, system 400 also maintains CL&DL features. As a result, the ROADM 400 and its method of operation provide significant advantages over existing systems. For example, compared with most common colorless and directionless MD-ROADM architectures that use an optical coupler to combine added signals, the ROADM node system 400 and its method of operation can improve the transmission performance by reducing the inter-channel optical crosstalk, while at the same time permitting the use any of the available channels for transmission on the network. This improvement can enable longer transmission distance and a better optical power budget. In addition, in comparison to MD-ROADM architectures shown in FIGS. 1 and 2, exemplary embodiments of the present invention significantly reduce hardware costs, as they enable the use of smaller hardware size and lower power consumption, and also avoid large single points of failures in the node.

In accordance with exemplary aspects of the present invention, each of the transponder aggregators 401-404 are assigned to be either an "odd" transponder aggregator or an "even" transponder aggregator. Here, a wavelength assignment scheme is applied to the transponder aggregators such that signals are permitted to be added and provided to the coupler 407 on only odd DWDM channels in the odd transponder aggregators and signals are permitted to be added and provided to the corresponding coupler 407 on only even DWDM channels in even transponder aggregators. In the exemplary embodiment of FIG. 4, transponder aggregators 401 and 403 are odd while transponder aggregators 402 and 404 are even. Thus, the signals of the transponders $405_1$-$405_p$ to be added by transponder aggregator 401 through its optical coupler 407 are on all odd channels. Because even channels are not permitted in this transponder aggregator, there is at least one channel gap between any two channels on which data is added by the transponders, as shown in plot 500 in FIG. 5A, illustrating a channel gap between channels 502 and 504. Similarly, for the combined signals in an even channel transponder aggregator, there is also at least one channel gap between any two even channels on which data is added. For example, as shown in plot 550 of FIG. 5B, there is a one channel gap between channels 552 and 554 and between channels 554 and 556. Furthermore, FIGS. 5A and 5B illustrate that that any resulting crosstalk 506, 558 and 560 between channels is much lower than the crosstalk exhibited in a convention ROADM node without an optical multiplexer, as indicated by comparison with plot 350 of FIG. 3B. The mitigation of crosstalk in accordance with exemplary aspects of the present invention is due to the constraint that adjacent DWDM channels are not permitted to be coupled in the transponder aggregator and, as a result, no adjacent channel crosstalk, which is defined as the crosstalk from the next channel on the standard transmission grid, occurs. In addition, whatever crosstalk that does occur is mainly at the rejected band, which is outside the clear channel passband defined by the channel spacing; any crosstalk in the signal passband is very small (beyond the range of the spectra here).

Figure 6A:
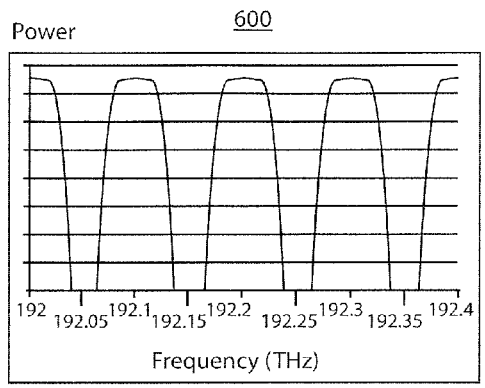
FIG. 6A is a graph illustrating an exemplary passband profile of a wavelength selective switch coupled to an output port of an exemplary ROADM node embodiment.
Figure 6B:
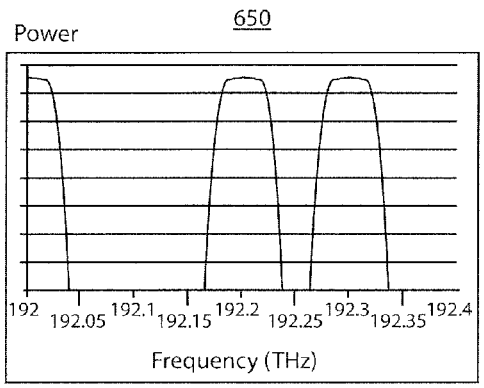
FIG. 6B is a graph illustrating another exemplary passband profile of a wavelength selective switch coupled to an output port of an exemplary ROADM node embodiment.
Figure 7A:
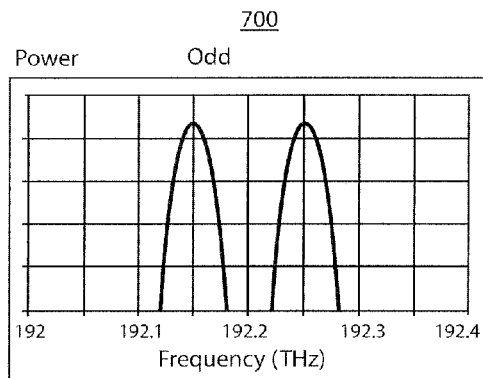
FIG. 7A is a graph illustrating a filtering function provided by a wavelength selective switch on channels including signals added by an odd transponder aggregator in an exemplary ROADM node embodiment.
Figure 7B:
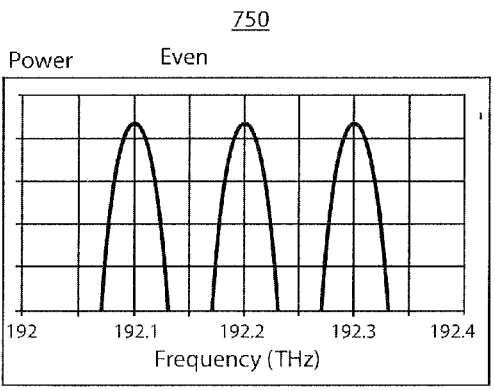
FIG. 7B is a graph illustrating a filtering function provided by a wavelength selective switch on channels including signals added by an even transponder aggregator in an exemplary ROADM node embodiment.

Returning to FIG. 4, the combined signals 408 are split through an optical splitter 409 and can be sent to the WSSs at all output ports. The signals 410-411 reaching the WSSs all have the same profile and crosstalk characteristics as the signals 408. Among these channels, each WSS 412 selects the appropriate channels 413 to be sent to its corresponding output port 415. Because these signals do not include contiguous channels, each passband within the WSS profile at each port includes only one channel. Plots 600 and 650 in FIGS. 6A and 6B, respectively, provide examples of WSS passband profiles of selected channels. As such, the WSS 412 also provides a filtering function for the added signals 410-411. The WSS 412 further reduces any remaining crosstalk, as the filtered signals provided by the WSS have passband widths that do not exceed channel spacing and have steep edges. After the WSS filtering, the odd channel signals and the even channel signals of FIGS. 5A and 5B behave as signals shown in plots 700 and 750 of FIGS. 7A and 7B, respectively. At the output 415 of each node, the signals received from one or more transponder aggregators on their corresponding channels are combined in the WSS 412 after such filtering. The resultant signals have the characteristics of the low crosstalk signals shown in FIG. 3A. Furthermore, the resultant signals can include any combination of channels, including signals from adjacent channels received from the transponder aggregators. In other words, the output signals at each output 415 are not constrained to being on odd or even channels only. Accordingly, even though an inter-channel cross-talk mitigation scheme has been applied for internal switching purposes, the ROADM node retains a substantial advantage in that it can fully utilize the available spectrum for transmission of signals on the WDM network. Moreover, ROADM nodes 400 maintains colorless and directionless features, as the transponders $405_1$-$405_p$ permit wavelength tuning (with odd/even constraints) and each channel from these transponders can be switched to any output port. The WSS 412 at the output end also eliminates the wavelength contention issue.

Figure 8:
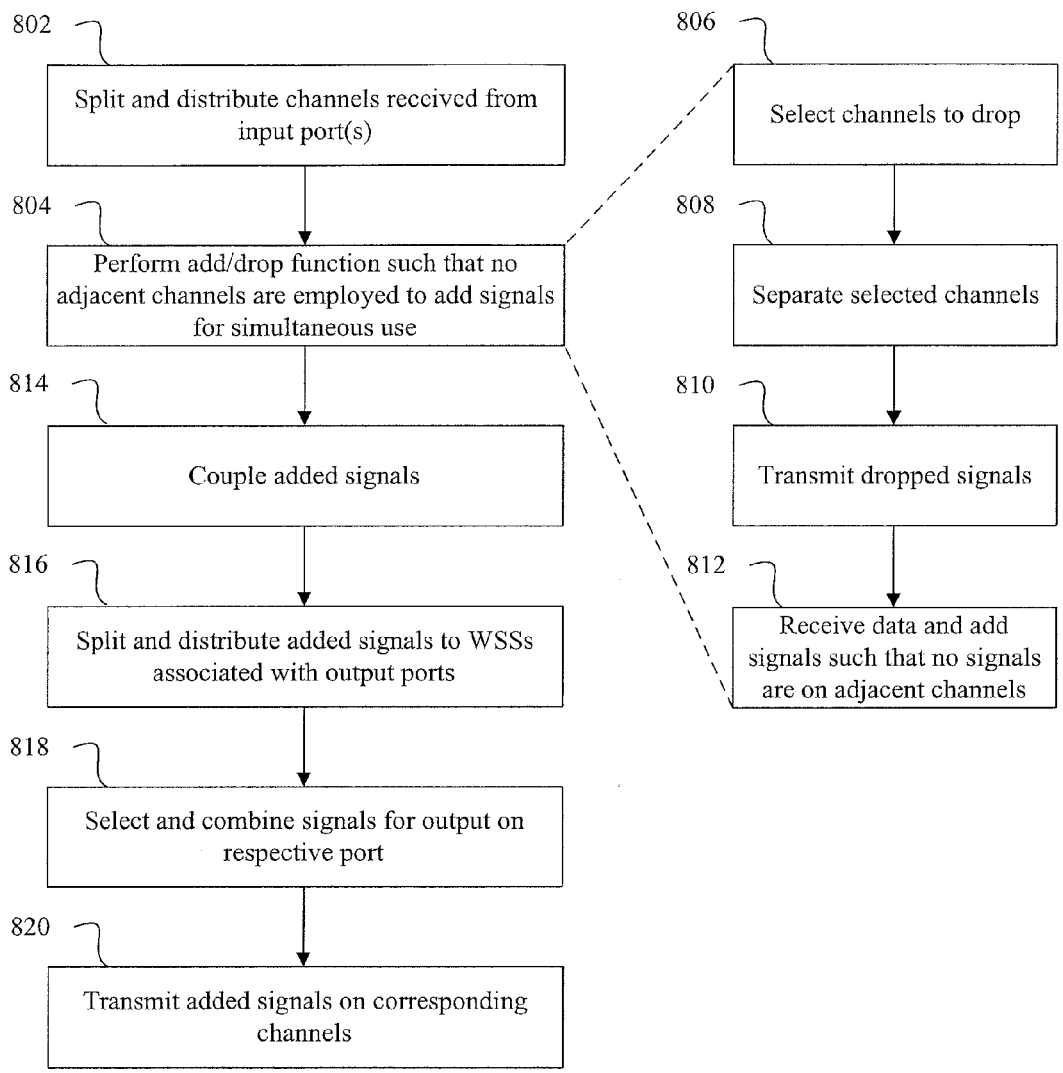
FIG. 8 is a flow diagram of an exemplary method for managing signals in a WDM network.

With reference now to FIG. 8 with continuing reference to FIG. 4, a block/flow diagram of a method 800 for managing signals in a WDM network implemented in accordance with exemplary embodiments of the present invention is provided. It should be understood that any one or more aspects of the ROADM node system/apparatus 400 described above can be included in method 800. Likewise, any one or more aspects of method 800 described herein below can be included in ROADM node system/apparatus 400. In addition, it should also be understood that not all steps described herein below are essential and alternative exemplary embodiments of the present invention may include other steps, may implement steps described herein below differently and/or may omit steps described herein below.

It should be noted that the channels employed by an ROADM node system that implements method 800 may correspond to DWDM channels of a standard grid, as discussed above with respect to FIG. 4. Thus, the channels employed may be pre-defined and have consistent channel spacing. For example, as illustrated in 3B, the channels may be pre-defined with a channel spacing of 0.05 THz, where 192.10 THz, 192.15 THz, 192.20 THz, 192.25 THz, etc. are included in the set of pre-defined channels employed by the system. Further, the ROADM node can be preconfigured to employ the set of pre-defined channels for switching and/or for downstream and/or upstream transmission of signals on a WDM network.

At step 802, channels received from input ports may be split and distributed. For example, any one or more splitters 416 can be configured to perform step 802. For example, as discussed above with respect to FIG. 4, any one or more splitters 416 can split signals received from an input port 414 for distribution to WSSs 412 as well as WSSs 417 in the various transponder aggregators. One or more of the transponder aggregators can receive the same signals or at least some of the signals received by the transponder aggregators can be the same signals.

At step 804, an add/drop function may be performed such that no adjacent channels are employed to add signals for simultaneous transmission. For example, step 804 may be implemented via steps 806-812. It should be noted that step 806, as well as steps 814 and 816, can be performed by one or more of the transponder aggregators 401-404.

At step 806, an element may select channels to drop. For example, as discussed above with respect to FIG. 4, each of the WSSs 417 can select signals on corresponding channels to drop and to provide to their corresponding transponders $405_1$-$405_p$. In turn, the selected channels may be separated at step 808. For example, channel separator 418 may be configured to separate channels for the signals dropped by WSS 417.

At step 810, the dropped signals may be transmitted. For example, as discussed above with regard to FIG. 4, any one or more of the transponders $405_1$-$405_p$ may convert the dropped signals to electrical signals and may transmit the converted signals to one or more clients.

At step 812, data may be received and signals may be added such that no signals are on adjacent channels. For example, as discussed above with regard to FIG. 4, the transponders $405_1$-$405_p$, of each transponder aggregator 401-404 can receive data from clients in the form of electrical signals and can convert the signals to optical signals. Moreover, the optical signals can be added to switch through the ROADM node such that no signals are on adjacent channels.

For example, as discussed above with respect to FIG. 4, each transponder aggregator may be assigned to be an "odd" transponder aggregator or an "even" transponder aggregator such that only "odd" channels of the pre-defined channels are used by an odd transponder aggregator to add signals and only "even" channels of the pre-defined channels are used by an even transponder aggregator to add signals. In this way, for example, each transponder aggregator can be configured add signals to switch through the ROADM node such that the adding is constrained from adding signals on adjacent, pre-defined channels. For example, using the pre-defined channels indicated in FIGS. 5A and 5B as an example, both the odd transponder aggregator and the even transponder aggregator are constrained from adding signals on both channels 192.15 THz and 192.20 THz. In addition, the channels used by an odd transponder aggregator to add signals and the channels used by an even transponder aggregator to add signals can be mutually exclusive. For example, again using the pre-defined channels indicated in FIGS. 5A and 5B, an odd transponder aggregator may be configured to add signals on only channels within the set 192.15 THz, 192.25, 192.35, etc., while an even transponder aggregator may be configured to add signals on only channels within the set 192.10 THz, 192.20, 192.30, etc. Of course, the channel spacing and band employed can be varied.

It should be understood that although "odd" and "even" transponder aggregators were used as examples above, in accordance with other exemplary embodiments, the transponder aggregators are constrained from using certain channels only at certain moments in time. For example, at one moment in time, a transponder aggregator may add signals on channel 192.2 THz and is constrained from adding signals on channels 192.15 THz and 192.25 THz at that moment in time. At another moment in time, that same transponder aggregator may add signals on channel 192.25 THz and is constrained from adding signals on channels 192.20 THz and 192.30 THz. Thus, according to exemplary aspects, the transponder aggregator can be constrained from adding signals on adjacent channels for simultaneous use. It should be noted that the phrase "for simultaneous use" is not intended to exclude odd and even transponder aggregator embodiments discussed above. For example, odd and even transponder aggregator embodiments discussed above are also constrained from adding signals on adjacent channels for simultaneous use, as no adjacent channels are simultaneously used to add signals in the odd and even transponder aggregators.

Furthermore, it should also be noted that not all transponder aggregators need be constrained. For example, certain transponder aggregators may be configured to employ all available channels simultaneously while others may be configured to be constrained from employing adjacent pre-defined channels for simultaneous use, as discussed above. In addition, different constrained aggregators need not be assigned to exclusively odd or even channels. For example, different aggregators may be assigned a portion of odd channels and a portion of even channels while being constrained from adding signals on adjacent channels from the pre-defined channels. Moreover, as discussed above with respect to FIG. 4, each transponder $405_1$-$405_p$, can add signals on the channel on which dropped signals are received or can add signals on a channel that is different from the channel on which dropped signals are received, as long as the channel used is not employed elsewhere in the transponder aggregator and/or the ROADM node. Different configurations and ways of constraining one or more transponder aggregators from adding signals on adjacent channels are envisioned and are included in various exemplary embodiments of the present invention.

At step 814, the added signals may be coupled. For example, as discussed above with respect to FIG. 4, coupler 407 may be configured to receive added signals on corresponding channels from transponders $405_1$-$405_p$ and may couple the signals for transmission to the splitter 409.

At step 816, the added signals may be split and distributed to WSSs associated with output ports. For example, as discussed above with respect to FIG. 4, the splitter 409 may split added signals on corresponding channels received from the optical coupler 407 and may distribute the signals to the various WSSs 412 associated with output ports 415.

At step 818, channels may be selected and corresponding signals can be combined for output on a respective port. For example, as discussed above with respect to FIG. 4, one or more WSSs 412 may receive added signals from any one or more of the transponder aggregators 401-404 and may select and combine the signals received from one or more of the different aggregators with each other and/or with signals received from one or more couplers 416 for output. As stated above, the WSSs 412 may provide a filtering function that can further reduce crosstalk. For example, any one or more of the WSSs 412 can be configured to reject or filter out channels based on the origin of added signals. For example, for the signals received from an odd aggregator, such as aggregators 401 and 403, the respective input ports of WSS 412 can be configured to filter out even channels and thereby further reduce crosstalk. Simultaneously, for the signals received from an even aggregator, such as aggregators 402 and 404, the respective input ports of WSS 412 can be configured to filter out odd channels to further reduce crosstalk. For example, the WSS 412 can remove crosstalk, such as crosstalk 506 in FIG. 5A and crosstalk 558 and 560 in FIG. 5B, exhibited between odd channels and between even channels. In exemplary embodiments, a WSS 412 can be configured to filter out all even channels on input ports that receive signals exclusively from one or more odd transponder aggregators. The WSS 412 can alternatively or additionally be configured to filter out all odd channels on input ports that receive signals exclusively from one or more even transponder aggregators. However, as discussed above, different configurations and ways of constraining one or more transponder aggregators from adding signals on adjacent channels are envisioned. Thus, the WSS can be configured to filter out any channel from a transponder aggregator that the transponder aggregator is constrained from employing. For example, if the transponder aggregator is dynamically constrained from using certain channels from moment to moment, the WSS can dynamically filter those channels.

In addition, as discussed above, WSSs 412 can combine adjacent channels received from the transponder aggregators. As such, the output on ports 415 for downstream or upstream transmission on the network need not be constrained to have only "odd" or only "even" channels and may include adjacent channels from the pre-defined channels. Thus, any of the odd channels can be transmitted simultaneously from the ROADM node with any of the even channels via one or more output ports 415, thereby permitting the ROADM node to fully utilize the available spectrum even though an "odd" or "even" constraint was used for internal switching. Moreover, as discussed above, because each added channel from the transponders can be switched to any output port, the ROADM node can maintain colorless and directionless features.

At step 820, the signals can be transmitted on the added channels. For example, the signals combined by WSSs 412 can be output from the corresponding output ports 415.

It should be noted that, in accordance with the exemplary ROADM node system/apparatus embodiment 400 described above with regard to FIG. 4, even though an optical coupler is used at the transponder aggregators in lieu of an optical multiplexer, the inter-channel crosstalk, and, in particular, adjacent channel crosstalk, of the added signals is reduced to approximately the same level as inter-channel crosstalk exhibited in ROADM nodes using optical multiplexers for the added signals. Moreover, wavelength assignment constraints on transponder aggregators discussed above ensure that no adjacent channel crosstalk will occur within the transponder aggregator. In addition, as discussed above, the WSS at the output end of each degree can be utilized to further reduce the crosstalk from other channels. One significant advantage of aspects of the present principles is that although an inter-channel cross-talk mitigation scheme has been applied for internal switching purposes, the ROADM node is nonetheless capable of fully utilizing the available spectrum for transmission on the WDM network. These benefits can be achieved without additional costly hardware such as a large scale fiber switch or high port count WSSs.

It should be understood that embodiments described herein may be composed entirely of hardware elements or both hardware and software elements. In a preferred embodiment, the present invention is implemented in hardware and software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores the program for use by or in connection with the instruction execution system, apparatus, or device. The medium can be magnetic, optical, electronic, or semiconductor system (or apparatus or device). The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for managing signals in a wavelength-division multiplexing (WDM) network implemented in a reconfigurable optical add-drop multiplexer (ROADM) node comprising:
    adding a first set of signals via a first plurality of transponders within a first transponder aggregator to switch through the ROADM node such that the adding is dynamically constrained from adding signals on adjacent, pre-defined channels for simultaneous use from moment to moment;
    adding a second set of signals via a second plurality of transponders within a second transponder aggregator to switch through the ROADM node such that at least a portion of the second set of signals is on at least one channel that is adjacent to a channel including any of the signals in the first set of signals;
    assigning wavelengths to a first set of DWDM channels through the first channel transponder aggregators and a second set of DWDM channels through the second channel transponder aggregators and interleaving the aggregated wavelengths in pairs and dynamically filtering the pre-defined channels to mitigate cross-talk; and
    transmitting the first and second sets of signals from the ROADM node on corresponding channels.

2. The method of claim 1, further comprising:
    combining at least a subset of the added signals such that the combined signals include signals on adjacent channels, wherein the transmitting includes transmitting the combined signals.

3. The method of claim 2, wherein the combining further comprises filtering signals from the first plurality of transponders such that channels on which the first plurality of transponders are constrained from utilizing are filtered.

4. The method of claim 1, wherein the adding a second set of signals within a second transponder aggregator is constrained from adding signals on adjacent, pre-defined channels for simultaneous use.

5. The method of claim 4, wherein signals added by the first transponder aggregator and signals added by the second transponder aggregator are on mutually exclusive channels.

6. The method of claim 1, wherein the first plurality of transponders add signals on channels on which dropped signals are received.

7. The method of claim 1, wherein the transponders add signals on dense wavelength division multiplexing (DWDM) channels.

8. The method of claim 7, wherein the transponders have colorless access to the pre-defined channels.

9. The method of claim 7, wherein the transponders have directionless access to output ports of the ROADM node.

10. A reconfigurable optical add-drop multiplexer (ROADM) node system for managing signals in a wavelength-division multiplexing (WDM) network comprising:
a plurality of transponder aggregators, wherein each transponder aggregator comprises:
a plurality of transponders configured to add signals on a subset of channels from a pre-defined set of channels to switch through the ROADM node,
wherein at least one of the transponder aggregators is of a first type in which transponders are dynamically constrained from adding signals on adjacent, pre-defined channels for simultaneous use, and
wherein at least one other transponder aggregator of the plurality of aggregators is of a second type in which transponders add signals on at least one channel that a transponder aggregator of the first type is constrained from using to switch through the ROADM node where the wavelengths are assigned to a first set of DWDM channels through the first channel transponder aggregators and a second set of DWDM channels through the second channel transponder aggregators and the aggregated wavelengths are interleaved in pairs and the pre-defined channels are dynamically filtered to mitigate cross-talk.

11. The system of claim 10, further comprising:
a plurality of wavelength selective switches (WSSs), wherein each wavelength selective switch (WSS) of the plurality of WSSs is associated with a different output port and is configured to combine signals received from at least a subset of the plurality of transponder aggregators, wherein the combined signals are transmitted from the ROADM node and include signals on adjacent channels of the pre-defined channels.

12. The system of claim 11, wherein each WSS of the plurality of WSSs is further configured to filter signals from the transponder aggregators of the first type such that channels on which the transponder aggregators of the first type are constrained from utilizing are filtered.

13. The system of claim 10, wherein the transponders of a transponder aggregator of the second type are constrained from adding signals on adjacent, pre-defined channels for simultaneous use.

14. The system of claim 13, wherein signals added by the transponder aggregator of the first type and signals added by the transponder aggregator of the second type are on mutually exclusive channels.

15. The system of claim 13, wherein each of the transponder aggregators are either of the first type or of the second type.

16. The system of claim 10, further comprising:
a wavelength selective switch configured to select signals on corresponding channels to drop and provide to the plurality of transponders, wherein the plurality of transponders are further configured to add signals on channels on which dropped signals are received.

17. The system of claim 10, wherein the transponders add signals on dense wavelength division multiplexing (DWDM) channels.

18. The system of claim 17, wherein the transponders have colorless access to the pre-defined channels.

19. The system of claim 17, wherein the transponders have directionless access to output ports of the ROADM node system.

20. A transponder aggregator system for use in a reconfigurable optical add-drop multiplexer (ROADM) node for managing signals in a wavelength-division multiplexing (WDM) network comprising:
a plurality of transponders configured to add signals on a subset of channels from a pre-defined set of channels to switch through the ROADM node such that the transponders are dynamically constrained from adding signals on adjacent channels, from the pre-defined channels, for simultaneous use, where the wavelengths are assigned to a first set of DWDM channels through the first channel transponder aggregators and a second set of DWDM channels through the second channel transponder aggregators and the aggregated wavelengths are interleaved in pairs and dynamically filtered the pre-defined channels to mitigate cross-talk; and
a switch configured to select signals and corresponding channels to drop to the plurality of transponders.

* * * * *